United States Patent [19]
Pettibone et al.

[11] Patent Number: 4,733,884
[45] Date of Patent: Mar. 29, 1988

[54] CAMBER ADJUSTMENT DEVICE

[75] Inventors: Craig R. Pettibone, Lafayette; Jimmy D. Berry, Longmont, both of Colo.

[73] Assignee: Specialty Products Company, Longmont, Colo.

[21] Appl. No.: 65,725

[22] Filed: Jul. 2, 1987

Related U.S. Application Data

[63] Continuation-in-part of Ser. No. 893,153, Sep. 15, 1986, which is a continuation-in-part of Ser. No. 692,825, Jan. 18, 1985, Pat. No. 4,615,845.

[51] Int. Cl.$^4$ .............................................. B62D 17/00
[52] U.S. Cl. .................................................... 280/661
[58] Field of Search ........................ 280/661, 668, 663

[56] References Cited

U.S. PATENT DOCUMENTS

| | | | |
|---|---|---|---|
| 1,943,721 | 1/1934 | Carpenter et al. | 280/690 |
| 2,990,901 | 7/1961 | Chayne | 180/73 |
| 3,917,308 | 11/1975 | Schulz | 267/34 |
| 4,194,760 | 3/1980 | Shiomi et al. | 280/661 |
| 4,313,617 | 2/1982 | Muramatsu et al. | 280/661 |
| 4,418,938 | 12/1983 | Sullivan et al. | 280/661 |
| 4,420,170 | 12/1983 | Wysocki | 280/661 |
| 4,424,984 | 1/1984 | Shiratoru et al. | 280/661 |
| 4,462,241 | 7/1984 | Whisenant | 72/458 |
| 4,462,609 | 7/1984 | Ohe | 280/690 |
| 4,493,493 | 1/1985 | Satchell et al. | 280/661 |
| 4,580,807 | 4/1986 | Cox et al. | 280/661 |
| 4,614,359 | 9/1986 | Lundin et al. | 280/661 |
| 4,618,162 | 10/1986 | Specktor et al. | 280/661 |

Primary Examiner—Richard A. Bertsch
Attorney, Agent, or Firm—William P. O'Meara

[57] ABSTRACT

A camber adjustment device including a cam bolt and cam plate assembly and method of installation thereof which enables a vehicle to be quickly and conveniently provided with an assembly for adjusting the front wheel camber.

11 Claims, 11 Drawing Figures

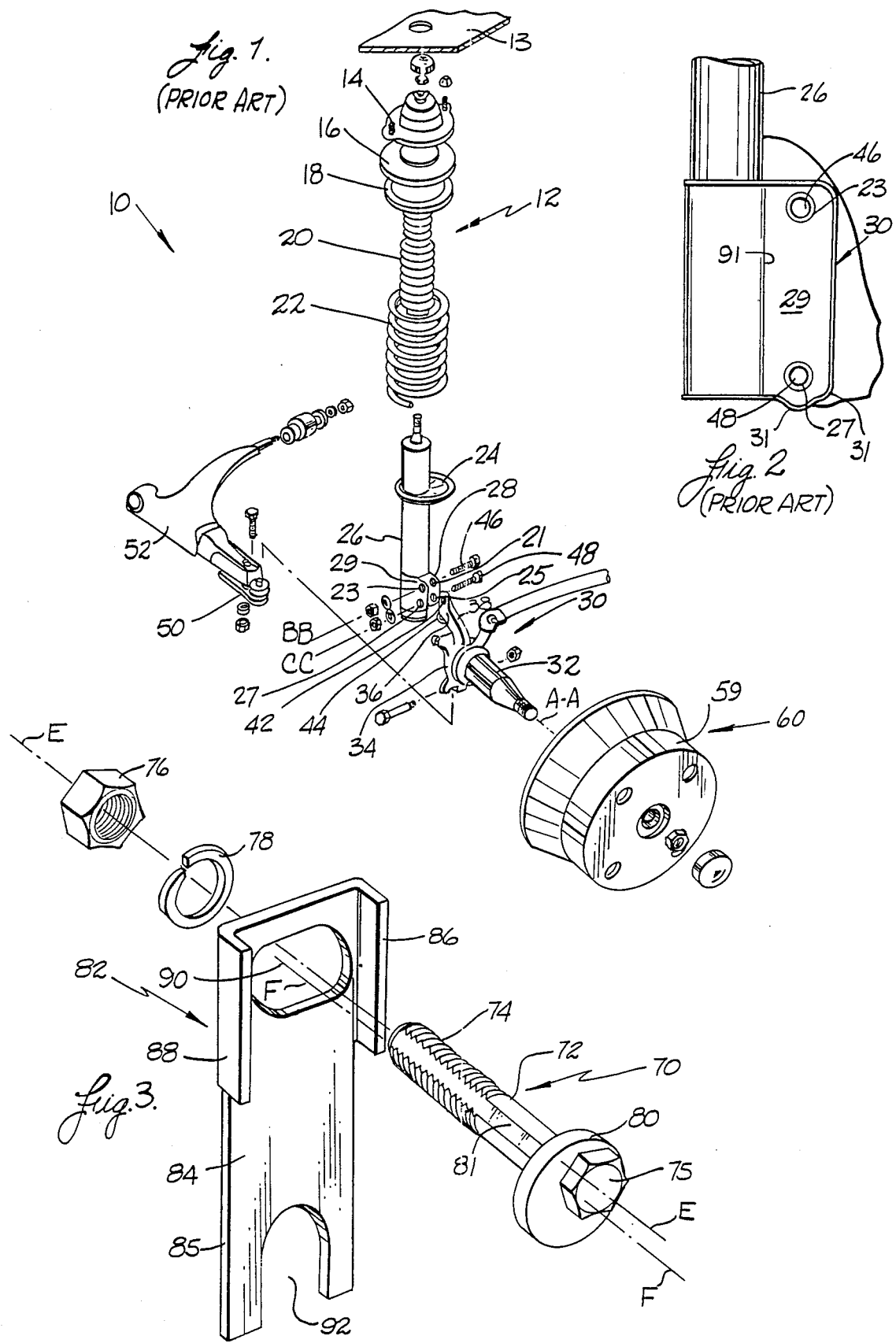

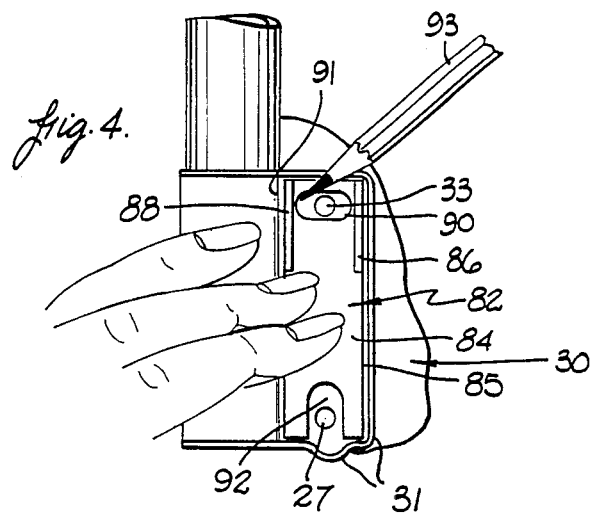
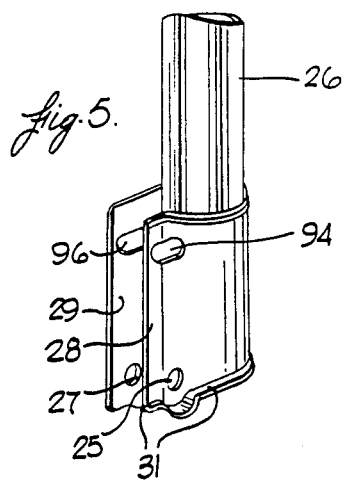
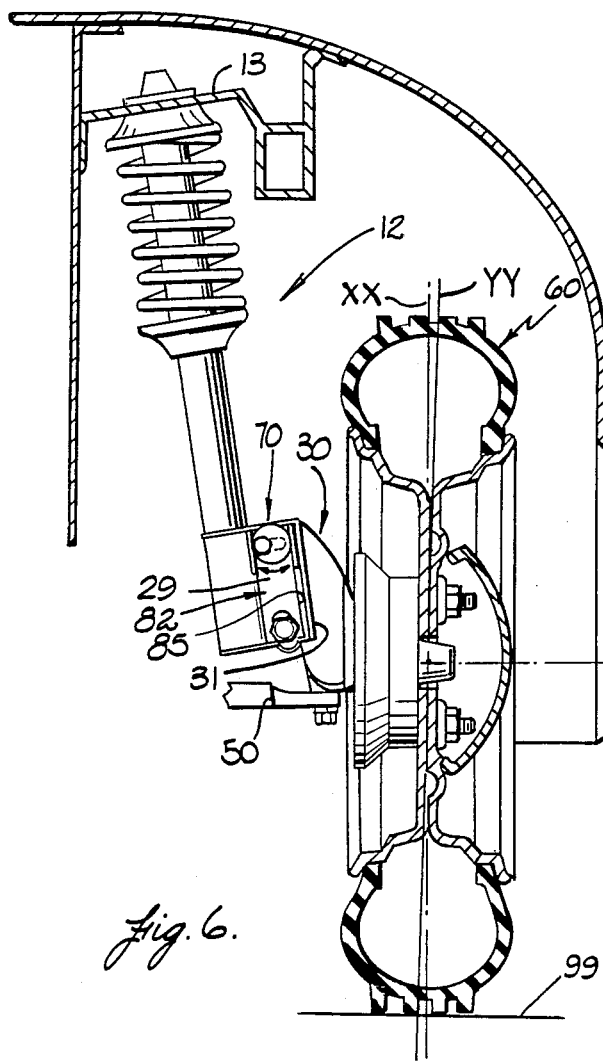
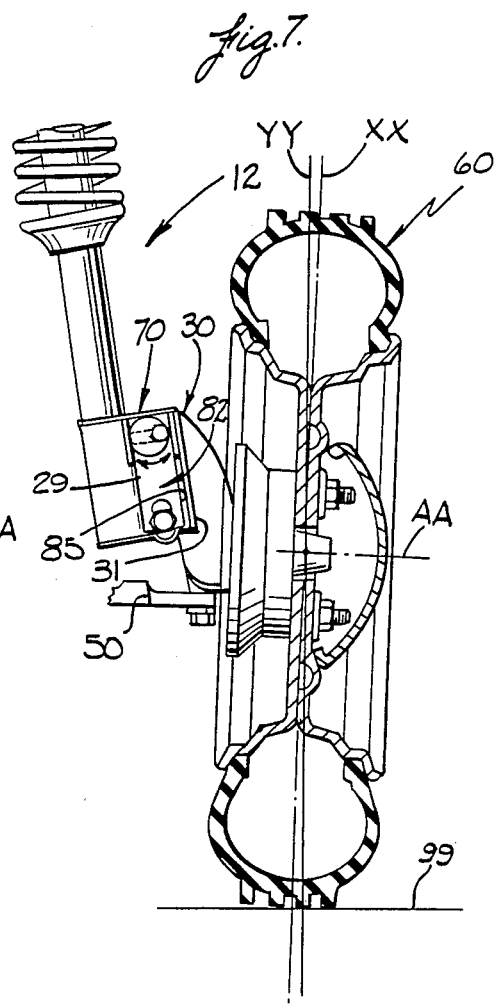

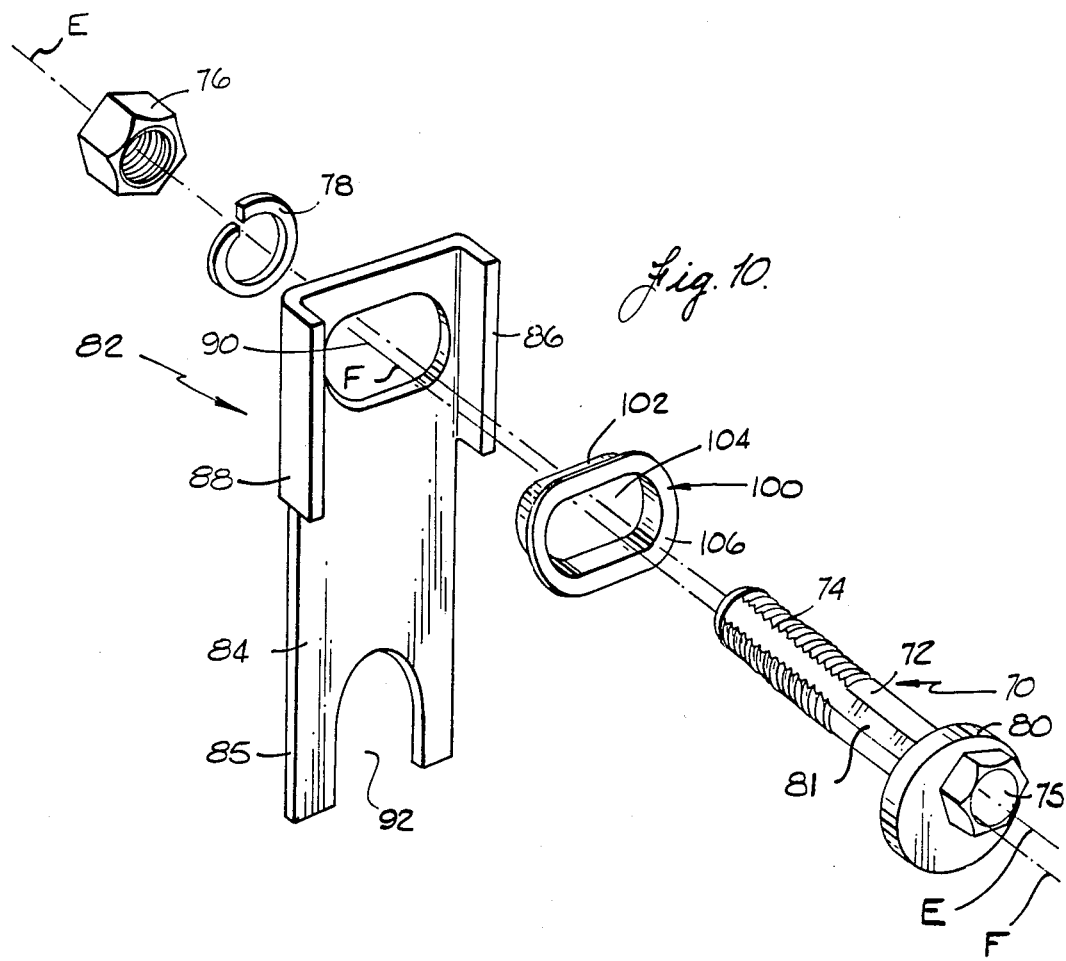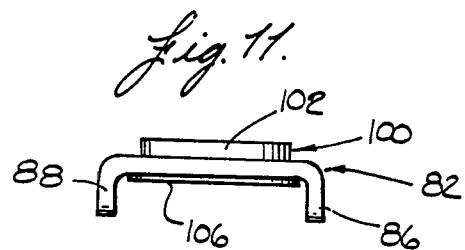

CAMBER ADJUSTMENT DEVICE

The present application is a continuation-in-part of U.S. patent application Ser. No. 893,153 for CAMBER ADJUSTMENT DEVICE filed Sept. 15, 1986, which is hereby incorporated by reference for all that it contains, which is a continuation-in-part of U.S. patent application Ser. No. 692,825, for TOE ADJUSTMENT APPARATUS of Craig Ralph Pettibone, filed Jan. 18, 1985, now U.S. Pat. No. 4,615,845 which is hereby incorporated by reference for all that it contains.

BACKGROUND OF THE INVENTION

The present invention relates generally to automotive products and, more particularly, to an apparatus for adjusting the camber in the steerable front wheels of a vehicle having an independent front wheel suspension system.

In a conventional independent front wheel suspension system for an automotive vehicle, each wheel is mounted independently of the other. Each rear wheel is rotatably mounted on a wheel spindle which is fixedly bolted to an integrally formed ball joint and wheel knuckle assembly. The wheel knuckle portion of this assembly is in turn bolted to the lower end of an elongate, generally vertically extending shock strut. The upper end of the shock strut is attached to a body side panel, typically by a rubber insulated top mount assembly with attachment bolts. Due to the length and resiliency of the shock strut, the spindle and attached wheel are, to a small degree, displaceable in a direction perpendicular to the longitudinal axis of the shock strut and are also torsionally (twistably) displaceable about this axis if otherwise unrestrained. In order to restrain this movement and hold the wheel in a fixed orientation with respect to the vehicle steering assembly, a longitudinally extending restraining member, generally referred to as a tie rod, and a laterally extending restraining member, generally referred to as a control arm, is affixed at one end to the ball joint and wheel knuckle assembly and at an opposite end to the vehicle steering assembly. Due to manufacturing tolerances, etc. in the front wheel assemblies, the "camber" of a wheel in some cases needs adjustment. The "camber" of a wheel refers to the relative angle which the central plane of the wheel makes with a vertical axis extending perpendicular to the surface on which the vehicle is supported. Ordinarily the wheel knuckle in such a front wheel suspension system is fixedly bolted to a pair of laterally extending flanges affixed to a lower end of the strut assembly. In such an arrangement, camber adjustment can only be effected by using the relative "slop" provided between the bolt assembly and the associated bolt holes in the strut flanges and wheel knuckle. However, this "slop" provides very little camber adjustment. In one prior art cam adjustment assembly, a cam bolt assembly which engages factory installed bosses on a strut flange is used to provide camber adjustment. However, most vehicles having the above described type of front wheel suspension system are not provided with such a cam adjustment assembly. It would be generally desirable to provide a cam adjustment assembly which could be easily retrofit on existing vehicles. However, providing bosses on a strut flange of the appropriate strength and tolerances for use with a cam bolt assembly is a very exacting and time-consuming operation which is beyond the skill of most automotive mechanics. Thus, prior to the present invention, there existed no convenient means for retrofitting a front wheel cam adjustment assembly on a vehicle having a front wheel suspension system of the type described above.

SUMMARY OF THE INVENTION

The present invention is directed to a cam bolt and cam plate assembly and method of installation thereof which enables a vehicle to be quickly and conveniently provided with an assembly for adjusting the front wheel camber.

The invention may comprise: a camber adjustment assembly for adjusting the camber of a wheel in a vehicle suspension system of the type ordinarily including a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first hole therein adapted to closely, axially slidingly receive a first bolt therein which also passes through a first pair of coaxially aligned holes in the strut flanges in close axially sliding relationship and with a second hole therein adapted to closely, axially slidingly receive a second bolt which also passes through a second pair of coaxially aligned holes in the strut flanges in close axially sliding relationship, the first and second holes in the wheel knuckle mounting portion being vertically spaced apart, the first and second bolt holes in the wheel knuckle mounting portion and the first and second pair of holes in the strut flanges having axes positioned in substantially perpendicular relationship with the axis of rotation of a wheel supported on the wheel knuckle assembly, the camber adjustment assembly comprising: (a) parallel laterally extending slot means provided in said pair of strut flanges by lateral extension of said first pair of holes therein; (b) cam bolt means having a central longitudinal axis for providing adjustable pivotal movement of said wheel knuckle about said axis of said second hole in said wheel knuckle mounting portion, said cam bolt means being received in said parallel slot means in said strut flanges and in said first hole in said wheel knuckle with said central longitudinal axis thereof positioned coaxially with said axis of said first hole in said wheel knuckle assembly and being adjustably laterally movable in said parallel slot means in a first relatively loosened state of said cam bolt means and being relatively fixed with respect to said parallel slot means in a second relatively tightened state of said cam bolt means; (c) cam plate means mounted on at least one of said strut flanges and adapted to coact with said strut flange and said cam bolt for causing said relative lateral displacement of said cam bolt in said strut flange parallel slot means during rotational movement of said cam bolt means about said cam bolt means central longitudinal axis in said first relatively loosened state; (d) whereby the camber of a wheel mounted on said wheel knuckle assembly is adjustable through rotation of said cam bolt means about said cam bolt means central longitudinal axis.

The invention may also comprise: a method of adjusting the camber of a wheel in a vehicle suspension system of the type ordinarily including a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first hole therein adapted to closely, axially slidingly receive a first bolt therein which also passes through a first pair of coaxially aligned holes in the strut flanges in close axially sliding relationship and with a second hole therein adapted to closely, axially slidingly receive a second bolt which also passes through a second pair of coaxially aligned holes in the strut flanges in close axially sliding relationship, the first and second holes in the wheel knuckle mounting portion being vertically spaced apart, the first and second bolt holes in the wheel knuckle mounting portion and the first and second pair of holes in the strut flanges having axes positioned in substantially perpendicular relationship with the axis of rotation of a wheel supported on the wheel knuckle, the camber adjustment assembly comprising: (a) removing the first bolt from the first hole in the wheel knuckle and the first pair of aligned holes in the strut flanges; (b) producing oppositely positioned, parallel, laterally extending slots in said pair of strut flanges having a vertical dimension approximately equal to the diameter of one of said first pair of holes and an expanded lateral dimension by lateral extension of said first pair of holes therein; (c) providing a cam bolt assembly comprising: an elongate threaded shaft portion having a central shaft longitudinal axis, a first end and a second end and having a diameter approximately equal to said first bolt; a cylindrical cam portion having a cylindrical axis positioned in parallel offset relationship with said shaft central longitudinal axis and positioned at said first end of said shaft portion; a bolt torquing portion positioned at a terminal portion of said first end of said shaft portion; a nut threadingly mountable on said second end of said threaded shaft portion; (d) providing a cam plate comprising: parallel cam engagement surfaces extending perpendicular to the direction of extension of said parallel laterally extending slots and spaced apart by a distance slightly larger than the diameter of said cylindrical cam portion of said cam bolt; a cam plate slot extending laterally between said cam engagement surfaces and having approximately the same configuration as the slots in the strut flanges and having strut flange engaging means for maintaining the cam plate in fixed relationship with an associated strut flange; (e) placing the cam plate in engagement with an outer surface of one of the strut flanges with the cam plate slot in aligned relationship with the laterally extending slot in the flange; (f) inserting the shaft portion of the cam bolt assembly through the slots in both strut flanges and the cam plate and through the first hole in the wheel knuckle mounting portion and positioning the cylindrical cam portion of the cam bolt assembly between the parallel cam engagement surfaces of the cam plate; (g) threading the cam assembly nut onto the cam shaft portion so as to prevent substantial axial movement of the cam bolt assembly and so as to allow rotational movement of the cam assembly; (h) maintaining the second bolt passing through the strut flanges and wheel knuckle in sufficiently loose engagement therewith so as to allow pivotal movement of the wheel knuckle assembly about the second bolt; (i) adjustably laterally moving the cam bolt assembly shaft portion within the slots in the strut flanges and cam plate so as to pivotally move the wheel knuckle assembly to adjust the camber of the associated wheel by selectively rotating the cam bolt assembly about the central longitudinal axis of the cylindrical cam portion thereof.

BRIEF DESCRIPTION OF THE DRAWING

FIG. 1 is an exploded perspective view of a prior art front wheel suspension system.

FIG. 2 is a detailed side elevation view of a strut flange and wheel knuckle portion of the front wheel suspension system of FIG. 1.

FIG. 3 is an exploded perspective view of a cam bolt and cam plate assembly.

FIG. 4 is a side elevation view illustrating the modification of the strut flange illustrated in FIG. 2.

FIG. 5 is a perspective view illustrating a pair of modified strut flanges.

FIGS. 6 and 7 are cross sectional elevation views illustrating camber adjustments using the cam plate and cam bolt assembly illustrated in FIG. 3.

FIG. 10 is an exploded perspective view of a cam bolt and cam plate assembly of FIG. 3 and further including a cam plate insert.

FIG. 11 is a top view of the cam plate and cam plate insert of FIG. 10.

DETAILED DESCRIPTION OF THE INVENTION

Figure 8:
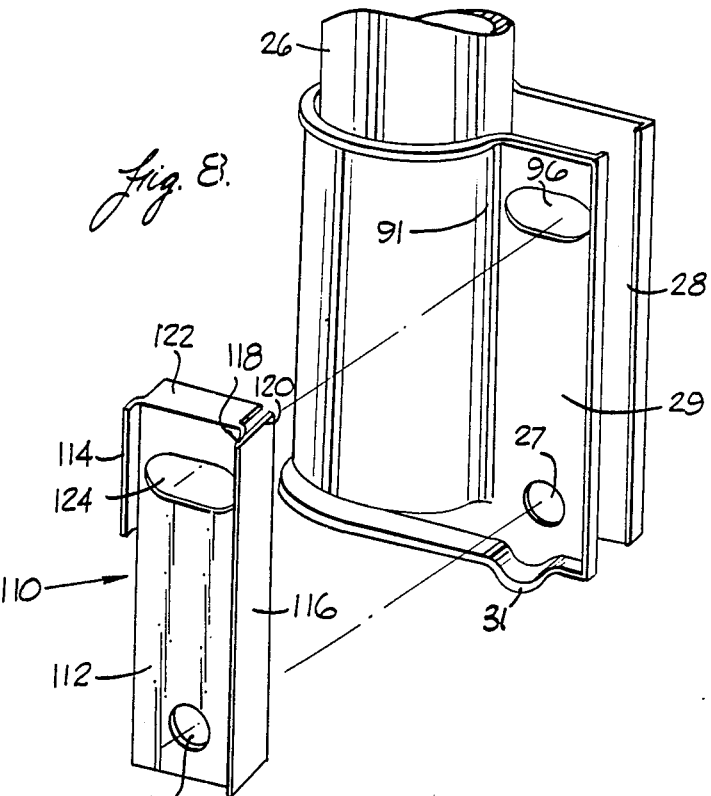
FIG. 8 is an exploded perspective view illustrating a second embodiment of a cam plate and an associated strut flange.

A camber adjustment assembly shown in FIG. 14 is adapted for adjusting the camber of a wheel assembly 60 of a prior art vehicle wheel suspension system of the type illustrated in FIGS. 1 and 2. Such a suspension system in general comprises a generally vertically extending strut assembly 12 having an upper end attached to a vehicle frame and body assembly 13. The strut assembly has a pair of strut flanges 28, 29 positioned in parallel relationship with one another which project laterally outwardly from the lower end of the strut assembly. The suspension systems also comprises a ball joint assembly 30 mounted on the strut assembly by a wheel knuckle portion 36 thereof positioned between the two strut flanges 28, 28 with a first hole 42 therein adapted to closely, axially slidingly receive a first bolt 46 therein which also passes through a first pair of coaxially aligned bolt holes 21, 23 in the strut flanges and with a second hole 44 in the knuckle portion adapted to closely, axially slidingly receive a second bolt 48 therein which also passes through a second pair of coaxially aligned holes 25, 27 in the strut flanges. The first and second holes 42, 44 in the wheel knuckle mounting portion are vertically spaced apart. The first and second bolt holes in the wheel knuckle portion, and the first and second pair of holes in the strut flanges having axes BB, CC, positioned in substantially perpendicular relationship with the axis of rotation AA of wheel assembly 60 supported on the ball joint assembly 30.

The camber adjustment assembly, in general, comprises parallel laterally extending slots 94, 96 provided in the pair of strut flanges 28, 29 by lateral extension of one of the pair of holes, e.g. 21, 23, FIGS. 4 and 5; a cam bolt assembly 70, FIG. 3, for providing adjustable pivotal movement of the wheel knuckle assembly 30 about the axis CC of the second bolt 48 associated with the second hole 44 in the wheel knuckle portion 36, the cam bolt assembly being received in the parallel slots 94, 96 in the strut flanges and in the first hole 42 in the wheel knuckle portion and being adjustable laterally movable in the parallel slots during a first relatively loosened state of the cam bolt assembly and being relatively fixed with respect to the parallel slots in a second relatively tightened state of the cam bolt assembly; a cam plate, e.g. 82, FIG. 3, mounted on at least one of the strut flanges and adapted to coact with the strut flange and the cam bolt assembly for causing relative lateral displacement of the cam bolt assembly in the strut flange parallel slots during rotational movement of the cam bolt assembly about a central longitudinal axis FF thereof during the first relatively loosened state; whereby the camber of a wheel mounted on the ball joint assembly 30 is adjustable through this rotation of the cam bolt assembly as shown generally in FIGS. 17 and 18.

Having thus described the invention in general, specific features of the invention and the vehicle wheel suspension system for which it is adapted will now be described in detail.

FIG. 1 illustrates a portion of a front wheel suspension system of the type which is presently in use in a number of newer vehicles. The wheel suspension system includes a strut assembly 12 which is attached at an upper end thereof to the vehicle frame and body assembly 13 as further illustrated in FIG. 6. The strut assembly may include a strut mount 14, an upper spring seat 16, a seal 18, a dust boot 20, a coil spring 22, a lower spring seat 24, a strut 26, and a pair of laterally projecting parallel strut flanges 26, 28 which are fixedly mounted on the strut. In one embodiment which is further described below, the strut flanges may comprise a peripheral outwardly projecting lip portion 31, FIG. 2, which facilitates stabilizing of a cam plate 82 of the present invention. A wheel ball joint 30, which is adapted to rotatably support a wheel assembly 60, comprises a spindle 32 having an axis AA defining the rotational axis of the wheel. The spindle is mounted on a ball joint member 34 which is integrally connected with a wheel knuckle portion 36 by arm portion 38. The wheel knuckle portion 36 has an upper horizontally extending hole 42 therein and a lower horizontally extending hole 44 therein, each having an axis BB, CC respectively, positioned perpendicular to the wheel axis AA. Horizontally extending bolt assemblies 46, 48 are adapted to attach the knuckle portion 36 to the strut flanges 28, 29, as illustrated in FIGS. 1 and 2. A steering knuckle assembly 50 associated with a lower control arm assembly 52 is adapted to be connected with a lower portion of the assembly 30. A hub portion 59 of the wheel assembly 60 which is mountable on spindle 32 is also illustrated in FIG. 1.

As illustrated in FIG. 3, in one embodiment, the cam bolt assembly 70 of the present invention may comprise a cam bolt shaft portion 72 having a central longitudinal axis EE and having a threaded portion 74; a cam bolt head 75 and a cam bolt nut 76 threadingly receivable on the cam bolt shaft threads 74. A lock washer 78 may also be provided. A cylindrical cam body 80 having a central cylindrical axis FF positioned in parallel, slightly offset relationship, e.g. ¼ inch, with axis FF, is fixedly mounted on shaft portion 72 adjacent cam bolt head 75 as by providing a flat surface 81 on shaft 72 and a complimentary hole in the cylindrical cam body (not shown) and by welding of the cylindrical cam body 80 to the shaft portion 72, or by other conventional attachment means well-known in the art. As also illustrated by FIG. 3, a cam plate 82 of the present invention may comprise a flat, vertically extending body portion 84 having a peripheral edge portion 85 which is adapted to be engaged at portions thereof by lip portion 31 on one of the strut flanges to prevent lateral movement of the plate, FIGS. 6 and 7. The plate is also prevented from moving laterally by shoulder portion 91 of a flange produced by the curvature of strut 26. Cam plate 82 also comprises cam body engaging flange portions 86, 88 and a cam plate laterally extending slot 90 having a minor axis dimension equal to the diameter of holes 21, 23. The cam plate may also be provided with a lower open ended slot 92 adapted to receive lower bolt 48 therein for facilitating holding of the cam plate in fixed relationship with respect to an associated flange, e.g. flange 28. As illustrated in FIGS. 4 and 5, in adapting a conventional pair of strut flanges such as 28, 29 having two pair of bolt holes 21, 23, 25, 27 therein, the cam plate 82 may be used as a template which is positioned with slot 92 in circumscribing relationship with one of the upper flange holes, e.g. 23, and extending generally laterally of the flange. Thereafter, a scribing instrument such as, e.g. pencil 93, is used to trace out a slot pattern on the flange. Thereafter, an identical operation is performed for the other flange. Next, the holes 21, 23 are extended laterally to provide a pair of parallel, oppositely positioned slots 94, 96 in the two flange portions 28, 29 which are identical in configuration to the slot 90 of the cam plate as shown by FIG. 5. Next, the cam bolt assembly 70 which is designed to be of comparable length and diameter to bolt assembly 46 is, in combination with cam plate 82, used to replace bolt assembly 46. To accomplish this result, the cam plate 82 is held against one of the slotted flanges at the same position as when used for a template, as illustrated in FIG. 15. The cam bolt is then inserted through the slot 90 in the cam plate and through both slots 94, 96 in the strut flanges, and also through the associated hole 44 in the knuckle assembly which is positioned between the two flanges. The cylindrical cam body 80 which has a diameter slightly less than the diameter between the two cam engaging flanges 84, 86 of the cam plate, is positioned between these two cam engagment portions, and the nut 76 is threaded onto shaft 72 in sufficiently tight relationship to hold the cam body 80 between the two cam plate flanges 86, 88 and yet sufficiently loosely to enable rotation of the cam assembly 70 through torquing of the cam assembly head 75. The lower bolt assembly 48 is loosened somewhat to enable the wheel knuckle 36 to be relatively pivoted thereabout. Next, the cam bolt assembly is rotated by torquing end 75 so as to move the cam bolt assembly shaft portion 72 laterally within the slots 90, 94, 96. Such lateral movement of the shaft 72 produces corresponding pivotal movement of the entire ball joint assembly 30 which in turn produces displacement of the plane of symmetry XX of the wheel assembly 60 relative a vertical axis YY, i.e. an axis disposed perpendicular to a surface 99 on which the wheel is supported. Thus, the top portion of the wheel assembly 60 may be moved relatively inwardly by lateral inward movement of the cam bolt shaft, as illustrated by FIG. 6 and may also be moved relatively outwardly by lateral outward movement of the cam bolt shaft, as illustrated in FIG. 7. when a desired camber position is achieved, both the bolt assembly 48 and the cam bolt assembly 70 are tightened by torquing of the associated nuts to lock the wheel assembly 60 into the desired camber position.

As illustrated in FIGS. 10 and 11, in another embodiment of the invention, which is presently the best mode contemplated, a cam bolt assembly 70 and cam plate 82 identical to those described above with reference to FIG. 3 are provided, and additionally an insert member 100 is provided which is preferably constructed from high strength semi-rigid plastic or the like.

The insert member 100 comprises an axially extending flange portion 102 having an outer dimension and configuration approximately identical to that of slot 90 whereby insert 100 is closely slidingly insertable into slot 90. The thickness of flange 102 may be, e.g. 0.03 inches whereby a slot 104 is provided in the insert which is approximately the same size and shape, although slightly smaller than slot 92. The axial length of flange portion 102 is substantially greater than the thickness of plate 82, e.g. twice the thickness, whereby flange portion 102 protrudes through plate 82, as illustrated in FIG. 11, and is thereby also insertable in close axially sliding relationship with an associated slot, e.g. 94, in the associated flange portion, e.g. 28. A radially extending stop flange 106 is provided for limiting the axial movement of the insert through slot 90. The stop flange 106 which may be integrally formed with axial flange 102 may be significantly thinner than flange 102. For example, flange 106 may be 0.005 inches thick. The dimensions of slot 104 are such as to provide substantially the same horizontally movable vertically non-movable relationship with bolt assembly 70 as that provided between bolt assembly 70 and slot 90 as discussed with reference to FIG. 3. The axially extending flange portion 102 of insert 100 coacts with the periphery of slot 90 and the periphery of an associated strut flange slot 94 or 96 to prevent lateral displacement between the cam plate 82 and associated strut flange 28, 29 when the cam bolt is inserted through and tightened in slot 104. Thus, insert 100 provides a cam plate stabilizing means.

FIG. 8 illustrates a somewhat different embodiment 10 of a cam plate which comprises a flat body 112, a first cam engagement flange portion 114, and a second double flange 116 having a forwardly projecting cam engagement portion 118 and a rearwardly projecting strut flange engaging portion 120. The cam plate 110 also comprises an upper rearwardly projecting strut flange engaging flange 122 and has a laterally extending slot 124 extending between cam engagement portions 114 and 118. In this embodiment, a lower hole 126 is provided for accepting lower bolt assembly 48. This cam plate 110 coacts in an identical manner with the cam bolt assembly as the previously described cam plate and is held in relatively fixed relationship with respect to an associated flange 29 by the coaction of flange portions 116, 122 thereof with peripheral portions of the associated flange 29.

Figure 9:
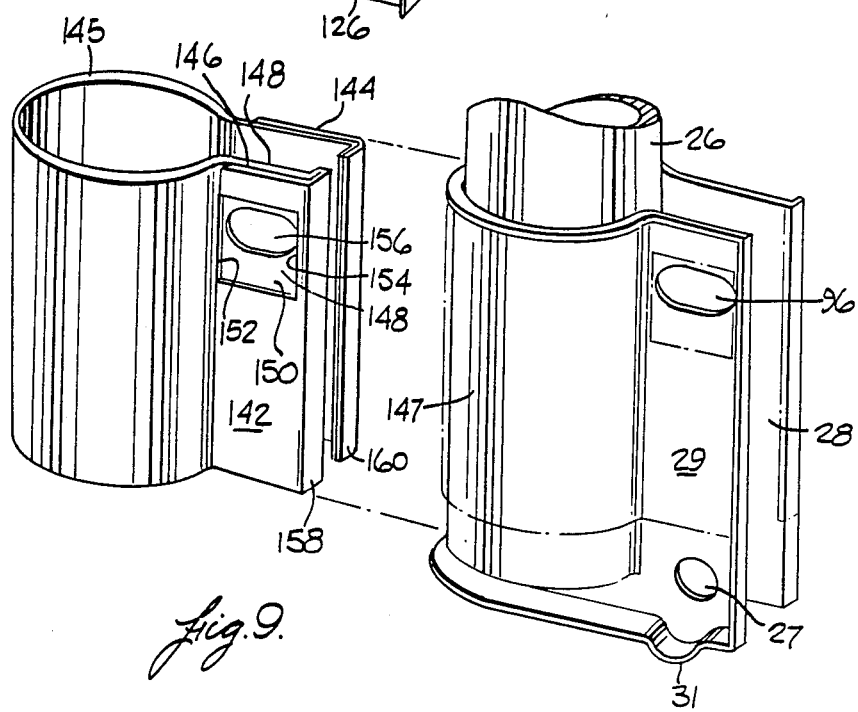
FIG. 9 is an exploded perspective view illustrating a third embodiment of a cam plate and associated strut flange.

In yet another embodiment of a cam plate as illustrated at 140 in FIG. 9, the cam plate assembly 140 comprises a first plate portion 142 and an identical second plate portion 144 interconnected by a flexible plate portion 145 which is adapted to extend about and engage an associated strut flange connector portion 147 which connects the two strut flanges 28, 29. Each of the first plate portions 142 and the second plate portion 144 have a double thickness comprising a first plate thickness 146 and a second plate thickness 148. A cutout portion 150 in the first plate thickness provides cam engaging surfaces 152, 154 which are operatively associated wtih a slot 156 in the second thickness portion 148. Flanges 158, 160 may also be provided for engaging outer peripheral portions of strut flanges 28, 29. Thus, attachment portion 145 and flange portions 158, 160 enable this cam plate assembly 140 to remain in relatively fixed relationship with respect to strut flange portions 28, 29 during adjustable movement of cam bolt assembly 70, and the cam bolt assembly 70 coacts therewith in the same manner as described above with reference to the first cam plate embodiment 82.

It is contemplated that the inventive concepts herein described may be variously otherwise embodied and it is intended that the appended claims be construed to include alternative embodiments of the invention except insofar as limited by the prior art.

What is claimed is:

1. A camber adjustment assembly for adjusting the camber of a wheel in a vehicle suspension system of the type ordinarily including a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly movably mounted on the strut assembly and having a mounting portion positioned between the two strut flanges with a first hole therein adapted to closely, axially slidingly receive a first bolt therein which also passes through a first pair of coaxially aligned holes in the strut flanges in close axially sliding relationship and with a second hole therein adapted to closely, axially slidingly receive a second bolt which also passes through a second pair of coaxially aligned holes in the strut flanges in close axially sliding relationship, the first and second holes in the wheel knuckle mounting portion being vertically spaced apart, the first and second bolt holes in the wheel knuckle mounting portion and the first and second pair of holes in the strut flanges having axes positioned in substantially perpendicular relationship with the axis of rotation of a wheel supported on the wheel knuckle assembly, the camber adjustment assembly comprising:

(a) parallel laterally extending slot means provided in said pair of strut flanges by lateral extension of said first pair of holes therein;

(b) cam bolt means having a central longitudinal axis for providing adjustable pivotal movement of said wheel knuckle about said axis of said second hole in said wheel knuckle mounting portion, said cam bolt means being received in said parallel slot means in said strut flanges and in said first hole in said wheel knuckle with said central longitudinal axis thereof positioned coaxially with said axis of said first hole in said wheel knuckle assembly and being adjustably laterally movable in said parallel slot means in a first relatively loosened state of said cam bolt means and being relatively fixed with respect to said parallel slot means in a second relatively tightened state of said cam bolt means;

(c) cam plate means mounted on at least one of said strut flanges and adapted to coact with said strut flange and said cam bolt for causing said relative lateral displacement of said cam bolt in said strut flange parallel slot means during rotational movement of said cam bolt means about said cam bolt means central longitudinal axis in said first relatively loosened state;

(d) whereby the camber of a wheel mounted on said wheel knuckle assembly is adjustable through rotation of said cam bolt means about said cam bolt means central longitudinal axis.

2. The invention of claim 1 wherein said cam bolt means comprises adjustable tightening means for placing said cam bolt means in said first relatively loosened state and said second relatively tightened state.

3. The invention of claim 2 wherein said tightening means comprise a nut and lock washer.

4. The invention of claim 1 wherein said cam bolt means comprises:
an elongate threaded shaft portion having a central shaft longitudinal axis, a first end and a second end and being adapted to be closely slidingly accepted in said first hole of said wheel knuckle mounting portion and adapted to be laterally displaceable and vertically nondisplaceable in said parallel lateral slot means;
a cylindrical cam portion having a cylindirical axis positioned in parallel offset relationship with said shaft central longitudinal axis and positioned at said first end of said shaft portion;
a bolt torquing portion positioned at a terminal portion of said first end of said shaft portion;
a nut threadingly mounted on said second end of said threaded shaft portion.

5. The invention of claim 4 wherein said cam plate means comprises:
parallel cam engagement surfaces extending perpendicular to the direction of extension of said parallel laterally extending slot means and spaced apart by a distance slightly larger than the diameter of said cylindrical cam portion of said cam bolt and adapted to receive said cylindrical cam portion of said cam bolt means therebetween in axially rotatable, laterally nondisplaceable relationship therein in said loosened state and in totally nondisplaceable relationship therein in said tightened state;
cam plate slot means extending laterally between said cam engagement surfaces and adapted to receive said shaft portion of said cam bolt means therethrough in axially rotatable, laterally displaceable, vertically nondisplaceable relationship therein in said loosened state and in totally nondisplaceable, relationship therein in said tightened state;
whereby axial rotation of said shaft portion through torquing of said torquing portion produces adjustably controllable oscillating lateral displacement of said shaft portion;
whereby said wheel knuckle is pivotally movable about said axis of said second bolt by said torquing of said cam bolt means during said loosened state thereof.

6. The invention of claim 5 wherein said cam plate means further comprises:
stabilizing means for preventing movement thereof relative said at least one strut flange on which it is mounted.

7. The invention of claim 6 wherein said cam plate stabilizing means comprises:
engaging lip portions on said at least one strut flange.

8. The invention of claim 6 wherein said cam plate stabilizing means comprises:
second bolt receiving means on said cam plate for receiving said second bolt insertable through said second pair of strut flange holes.

9. The invention of claim 6 wherein said cam plate stabilizing means comprises:
flange portions of said cam plate means adapted to engage said strut flange.

10. The invention of claim 6 wherein said cam plate stabilizing means comprises:
a first attachment portion adapted to be attached to one of said strut flanges;
a second attachment portion adapted to be attached to the other of said strut flanges; and
flexible encompassing means attached to said first and second attachment portions and adapted to engage a peripheral portion of said strut assembly positioned between said strut flanges.

11. The invention of claim 6 wherein said cam plate stabilizing means comprises:
slot flange means protruding axially outwardly from said cam plate slot and adapted to be slidingly received in said slot means in said strut flange positioned adjacent said cam plate for engaging an inner peripheral surface of said cam plate.

* * * * *

REEXAMINATION CERTIFICATE (1044th)
United States Patent [19]

Pettibone et al.

[11] B1 4,733,884
[45] Certificate Issued Apr. 18, 1989

[54] CAMBER ADJUSTMENT DEVICE

[75] Inventors: Craig R. Pettibone, Lafayette; Jimmy D. Berry, Longmont, both of Colo.

[73] Assignee: Specialty Products Company, Longmont, Colo.

Reexamination Request:
No. 90/001,487, Mar. 28, 1988

Reexamination Certificate for:
Patent No.: 4,733,884
Issued: Mar. 29, 1988
Appl. No.: 65,725
Filed: Jul. 2, 1987

Related U.S. Application Data

[63] Continuation-in-part of Ser. No. 893,153, Sep. 15, 1986, which is a continuation-in-part of Ser. No. 692,825, Jan. 18, 1985, Pat. No. 4,615,845.

[51] Int. Cl.⁴ .............................................. B62D 17/00
[52] U.S. Cl. .................................................. 280/661
[58] Field of Search ....................... 280/661, 663, 668

[56] References Cited
U.S. PATENT DOCUMENTS

| | | | |
|---|---|---|---|
| 1,943,721 | 1/1934 | Carpenter et al. | 280/690 |
| 2,198,544 | 4/1940 | Leighton | 280/661 |
| 2,990,901 | 7/1961 | Chayne | 180/73 |
| 3,163,441 | 12/1964 | Traugott | 280/661 |
| 3,917,308 | 11/1975 | Schulz | 267/34 |
| 4,194,760 | 3/1980 | Shiomi et al. | 280/661 |
| 4,313,617 | 2/1982 | Muramatsu et al. | 280/661 |
| 4,418,938 | 12/1983 | Sullivan et al. | 280/661 |
| 4,420,170 | 12/1983 | Wysocki | 280/661 |
| 4,424,984 | 1/1984 | Shiratori et al. | 280/661 |
| 4,462,241 | 7/1984 | Whisenant | 72/458 |
| 4,462,609 | 7/1984 | Ohe | 280/690 |
| 4,493,493 | 1/1985 | Satchell et al. | 280/661 |
| 4,580,807 | 4/1986 | Cox et al. | 280/661 |
| 4,614,359 | 9/1986 | Lundin et al. | 280/661 |
| 4,618,162 | 10/1986 | Specktor et al. | 280/661 |
| 4,650,208 | 3/1987 | Mason | 280/661 |
| 4,718,691 | 1/1988 | Specktor et al. | 280/661 |
| 4,736,964 | 4/1988 | Specktor | 280/661 |

OTHER PUBLICATIONS

Shim-A-Line, Inc. 1986 Wheel Alignment Catalogue (address 3520 Belt Line Blvd., Minneapolis, MN 55716).
Motor Auto Repair Manual, 42nd Edition (1979) by Motor, 1790 Broadway-8th floor, New York, N.Y. 10019, pp. 1-232, 1-233—see "1974-79 Corvette Rear Wheel Alignment" and Fig. 3.
Specialty Products Company Catalogue No. 8500 (Feb. 15, 1985) p. 18—see Product No. 85500.
Specialty Products Company 85500 Rear Toe Adjustment Kit Instructions sheet—enclosed with Specialty Products Company Product No. 85500 which was on sale prior to Aug. 4, 1985.

Primary Examiner—Richard A. Bertsch

[57] ABSTRACT

A camber adjustment device including a cam bolt and cam plate assembly and method of installation thereof which enables a vehicle to be quickly and conveniently provided with an assembly for adjusting the front wheel camber.

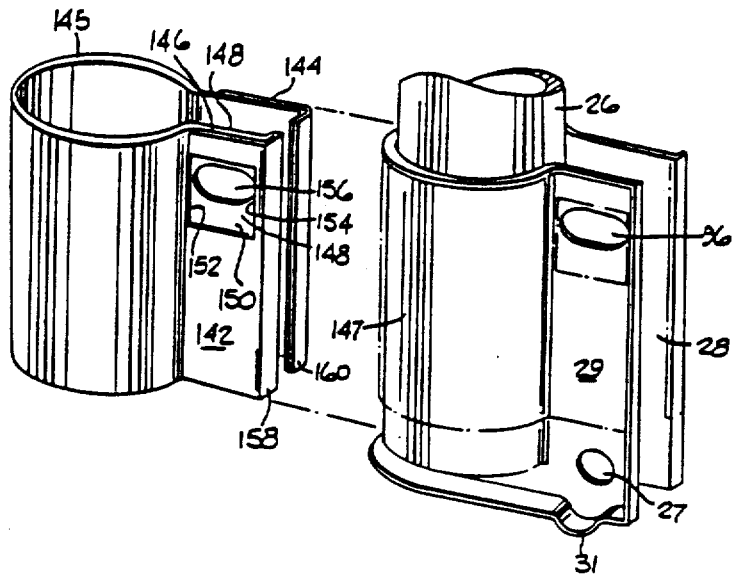

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 35 and 48:
A camber adjustment assembly shown in FIG. [14] *4* is adapted for adjusting the camber of a wheel assembly 60 of a prior art vehicle wheel suspension system of the type illustrated in FIGS. 1 and 2. Such a suspension system in general comprises a generally vertically extending strut assembly 12 having an upper end attached to a vehicle frame and body assembly 13. The strut assembly has a pair of strut flanges 28, 29 positioned in parallel relationship with one another which project laterally outwardly from the lower end of the strut assembly. The suspension systems also comprises a ball joint assembly 30 mounted on the strut assembly by a wheel knuckle portion 36 thereof positioned between the two strut flanges 28, [28] *29* with a first hole 42 therein adapted to closely, axially slidingly receive a first bolt 46 therein which also passes through a first pair of coax- Column 5, lines 19 and 20: bolt assembly about a central longitudinal axis FF thereof during the first relatively loosened state; whereby the camber of a wheel mounted on the ball joint assembly 30 is adjustable through this rotation of the cam bolt assembly as shown generally in FIGS. [17 and 18] *7 and 8.*

Column 5, line 34: bly 13 as further illustrated in FIG. 6. The strut assembly may include a strut mount 14, an upper spring seat 16, a seal 18, a dust boot 20, a coil spring 22, a lower spring seat 24, a strut 26, and a pair of latterally projecting parallel strut flanges [26, 28] *28, 29* which are fixedly mounted on the strut. In one embodiment which is Column 6, line 23: conventional pair of strut flanges such as 28, 29 having two pair of bolt holes 21, 23, 25, 27 therein, the cam plate 82 may be used as a template which is positioned with slot [92] *90* in circumscribing relationship with one of the upper flange holes, e.g. 23, and extending generally laterally of the flange. Thereafter, a scribing instrument Column 6, lines 38 and line 41: tion with cam plate 82, used to replace bolt assembly 46. To accomplish this result, the cam plate 82 is held against one of the slotted flanges at the same position as when used for a template, as illustrated in FIG. [15] *5*. The cam bolt is then inserted through the slot 90 in the cam plate and through both slots 94, 96 in the strut flanges, and also through the associated hole [44] *42* in the knuckle assembly which is positioned between the two flanges. The cylindrical cam body 80 which has a diameter slightly less than the diameter between the two cam engaging flanges 84, 86 of the cam plate, is positioned Column 7, line 17: inches whereby a slot 104 is provided in the insert which is approximately the same size and shape, although slightly smaller than slot [92] *90*. The axial length of flange portion 102 is substantially greater than the thickness of plate 82, e.g. twice the thickness, whereby flange portion 102 protrudes through plate 82, as illustrated in Column 7, line 59: associated flange 29 by the coaction of flange portions 116, 122 thereof with peripheral portions of the associated flange 29.

In yet another embodiment of a cam plate as illustrated [at 140] in FIG. 9, the cam plate assembly [140] comprises a first plate portion 142 and an identical sec- Column 8, line 6: Thus, attachment portion 145 and flange portions 158, 160 enable this cam plate assembly [140] to remain in relatively fixed relationship with respect to strut flange portions 28, 29 during adjustable movement of cam bolt assembly 70, and the cam bolt assembly 70 coacts therewith in the same manner as described above with reference to the first cam plate embodiment 82.

AS A RESULT OF REEXAMINATION, IT HAS BEEN DETERMINED THAT:

The patentability of claims 10 and 11 is confirmed.

Claims 1-9 are cancelled.

\* \* \* \* \*